United States Patent
Chotoku et al.

(10) Patent No.: US 6,728,473 B1
(45) Date of Patent: Apr. 27, 2004

(54) MOVING PICTURE RECORDING AND REPRODUCTION APPARATUS AND METHOD AS WELL AS MEDIUM

(75) Inventors: Koichi Chotoku, Tokyo (JP); Masashi Ohta, Tokyo (JP); Toshimichi Hamada, Tokyo (JP)

(73) Assignee: Sony Corporation, Tokyo (JP)

( * ) Notice: Subject to any disclaimer, the term of this patent is extended or adjusted under 35 U.S.C. 154(b) by 777 days.

(21) Appl. No.: 09/587,437

(22) Filed: Jun. 5, 2000

(30) Foreign Application Priority Data

Jun. 7, 1999 (JP) .......................... P11-159172

(51) Int. Cl.⁷ ................................ H04N 5/91
(52) U.S. Cl. .................. 386/95; 386/120; 386/121
(58) Field of Search ............... 386/46, 83, 95, 386/111, 112, 120, 121, 69

(56) References Cited

U.S. PATENT DOCUMENTS 5,546,191 A * 8/1996 Hibi et al. .................. 386/83
5,974,218 A * 10/1999 Nagasaka et al. ............. 386/46
6,427,048 B2 * 7/2002 Ito et al. ........................ 386/95

* cited by examiner

*Primary Examiner*—Huy Nguyen
(74) *Attorney, Agent, or Firm*—Frommer Lawrence & Haug LLP; William S. Frommer

(57) ABSTRACT

A moving picture recording and reproduction apparatus and method as well as a medium are disclosed by which, upon recording of a television program, representative pictures from which contents of a program can be grasped can be recorded. Frame pictures are extracted from moving pictures being recorded, and accuracy values with which a character is present in the frame pictures are calculated. Further, accuracy values with which the phase of a person is present in the frame pictures are calculated, and the levels of an audio signal corresponding to the frame pictures are detected. Then, evaluation values are calculated using results of the calculations and the detection, and a maximum one of the evaluation values is detected. Thereafter, the frame picture corresponding to the maximum evaluation value is reduced in size and recorded onto a recording medium so that it may be used as an index upon playing back of the recording medium.

7 Claims, 9 Drawing Sheets

MOVING PICTURE RECORDING AND REPRODUCTION APPARATUS AND METHOD AS WELL AS MEDIUM

BACKGROUND OF THE INVENTION

This invention relates to a moving picture recording and reproduction apparatus and method as well as a medium, and more particularly to a moving picture recording and reproduction apparatus and method as well as a medium wherein index information for moving pictures is used.

Conventionally, a video cassette recorder (VCR) is known which is used to record a television broadcast and has a function of recording index information such as a broadcasting hour, a channel and a genre of a recorded program at the top of a video cassette tape.

With a VCR having the function described, a user can recognize index information of programs recorded on a video cassette tape only if the top of the video cassette tape is played back. However, detailed contents of the programs recorded cannot be grasped unless the video cassette tape is played back from the top to the last end thereof.

In order to allow a user to grasp detailed contents of programs recorded on a video cassette tape without playing back the entire video cassette tape, for example, the following method may be used. In particular, upon recording, a still picture (or thumbnail picture) is extracted at each fixed time interval from a moving picture signal of a program being recorded, and the still pictures thus obtained are recorded collectively at a predetermined position of the video tape. Then, in order to confirm the contents of the program recorded on the cassette tape, only the predetermined position of the video cassette tape is played back.

Meanwhile, in recent years, increase in capacity and reduction in cost of recording media such as hard disks and increase in speed of processing for compression coding of an AV signal (a moving picture signal and an audio signal) have been and are being proceeded. Various electronic apparatus have been developed making use of such techniques so that an AV signal of a television program can be compression coded and recorded and then reproduced.

Since an electronic apparatus of the type described can record an AV signal of a great number of programs onto a recording medium of a large capacity, it preferably has such a function of extracting still pictures from a picture signal of a program being recorded and recording the still pictures onto a recording medium as described above so that a user can readily grasp AV signals of a plurality of programs recorded on the recording medium.

However, if a still picture is extracted at each fixed time interval from a moving picture signal of a television broadcast as described above, then a still picture which is not suitable to grasp contents of the program (for example, a commercial still picture or the like) may possibly be recorded. Thus, there is a subject to be solved in that still pictures suitable to grasp contents of a program cannot be extracted with certainty.

SUMMARY OF THE INVENTION

It is an object of the present invention to provide a moving picture recording and reproduction apparatus and method as well as a medium by which, upon recording of a television program, representative pictures from which contents of a program can be grasped can be recorded.

In order to attain the object described above, according to the present invention, when a moving picture signal of a television program is recorded onto a recording medium, still pictures which characterize contents of the television program and therefore allow contents of the television program to be specified are determined based on a predetermined algorithm and recorded in a reduced size onto the recording medium together with the moving picture signal so that they can be used as indices of the recording medium.

More particularly, according to an aspect of the present invention, there is provided a moving picture recording and reproduction apparatus, comprising recording means for recording a moving picture signal inputted thereto onto a recording medium, extraction means for extracting still pictures at a predetermined sampling rate from the moving picture signal, calculation means for calculating evaluation values of the still pictures extracted by the extraction means using pixel values of the still picture, detection means for detecting a maximum one of the evaluation values calculated by the calculation means, representative picture production means for reducing the size of the still picture corresponding to the maximum one of the evaluation values detected by the detection means to produce a representative picture, recording means for recording the representative picture produced by the representative picture production means onto the recording medium, reading means for reading out a representative picture or pictures from the recording medium, and table production means for applying the representative picture or pictures read out by the reading means to produce a representative picture table.

The detection means may detect a maximum evaluation value from among an arbitrary number of evaluation values per unit time.

The calculation means may use the pixel values of the still picture extracted by the extraction means to determine an accuracy with which a character is present on the still picture and use the accuracy to calculate the evaluation value.

As an alternative, the calculation means may use the pixel values of the still picture extracted by the extraction means to determine an accuracy with which the face of a person is present on the still picture and use the accuracy to calculate the evaluation value.

As another alternative, the calculation means may detect a level of an audio signal corresponding to the still picture extracted by the extraction means and use the level of the audio signal to calculate the evaluation value.

According to another aspect of the present invention, there is provided a moving picture recording and reproduction method, comprising a recording step of recording an inputted moving picture signal onto a recording medium, an extraction step of extracting still pictures at a predetermined sampling rate from the moving picture signal, a calculation step of calculating evaluation values of the still pictures extracted by the extraction step using pixel values of the still picture, a detection step of detecting a maximum one of the evaluation values calculated by the calculation step, a representative picture production step of reducing the size of the still picture corresponding to the maximum one of the evaluation values detected by the detection step to produce a representative picture, a recording step of recording the representative picture produced by the representative picture production step onto the recording medium, a reading step of reading out a representative picture or pictures from the recording medium, and a table production step of applying the representative picture or pictures read out by the reading step to produce a representative picture table.

According to a further aspect of the present invention, there is provided a medium for causing a computer to execute a program which comprises a recording step of recording an inputted moving picture signal onto a recording medium, an extraction step of extracting still pictures at a predetermined sampling rate from the moving picture signal, a calculation step of calculating evaluation values of the still pictures extracted by the extraction step using pixel values of the still picture, a detection step of detecting a maximum one of the evaluation values calculated by the calculation step, a representative picture production step of reducing the size of the still picture corresponding to the maximum one of the evaluation values detected by the detection step to produce a representative picture, a recording step of recording the representative picture produced by the representative picture production step onto the recording medium, a reading step of reading out a representative picture or pictures from the recording medium, and a table production step of applying the representative picture or pictures read out by the reading step to produce a representative picture table.

With the moving picture recording and reproduction apparatus, the moving picture recording and reproduction method and the program of the medium, an inputted moving picture signal is recorded onto a recording medium, and still pictures are extracted at a predetermined sampling rate from the moving picture signal. Then, evaluation values of the still pictures thus extracted are calculated using pixel values of the still picture, and a maximum one of the evaluation values thus calculated is detected. Thereafter, the size of the still picture corresponding to the detected maximum evaluation value is reduced to produce a representative picture, and the representative picture thus produced is recorded onto the recording medium. Further, a representative picture or pictures are read out from the recording medium, and the representative picture or pictures thus read out are applied to produce a representative picture table. Consequently, when a television program is recorded, a representative picture or pictures from which contents of the program can be grasped can be recorded onto a recording medium.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENT

Figure 1:
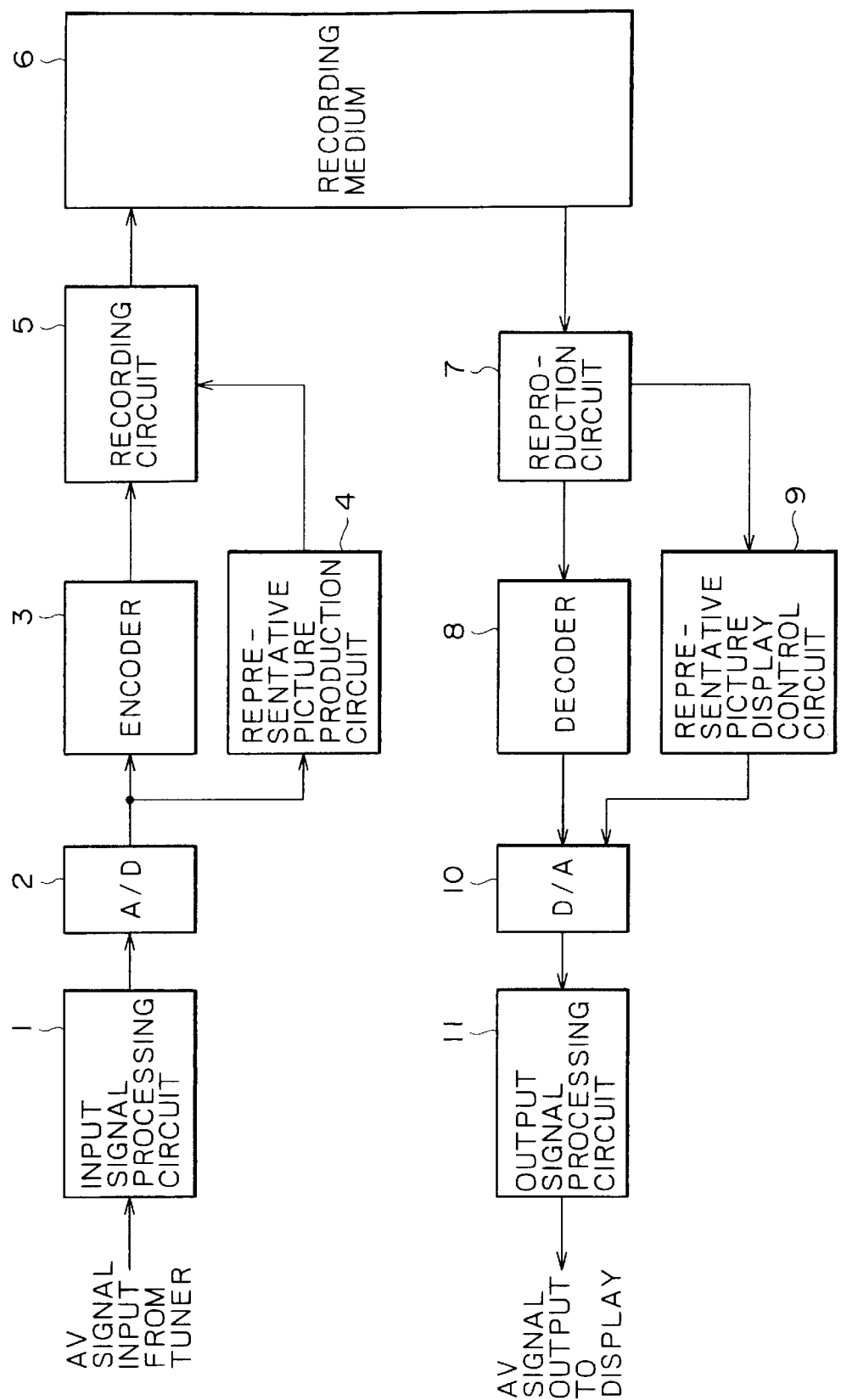
FIG. 1 is a block diagram showing an example of a construction of a video decoder to which the present invention is applied.

Referring first to FIG. 1, there is shown an example of a construction of a video recorder to which the present invention is applied. The video recorder shown includes an input signal processing circuit 1 which performs automatic gain control (AGC) processing and other necessary processing for an AV signal of a television signal inputted thereto from a tuner (not shown) and outputs a resulting signal to an analog to digital conversion circuit (A/D) 2. The analog to digital conversion circuit 2 converts the analog AV signal inputted thereto from the input signal processing circuit 1 into a digital signal and outputs the digital signal to an encoder 3 and a representative picture production circuit 4.

The encoder 3 performs compression coding for the digital signal inputted thereto from the analog to digital conversion circuit 2 using a predetermined method (for example, the MPEG (Moving Picture Experts Group) 2 method), addition of error correction codes, EFM (Eight to Fourteen Modulation) modulation and other necessary processing and outputs a resulting signal to a recording circuit 5. The representative picture production circuit 4 produces a compressed still picture (representative picture) using a moving picture signal of the digital AV signal inputted thereto from the analog to digital conversion circuit 2 at a timing based on the predetermined algorithm (details are hereinafter described) and outputs picture data of the compression still picture to the recording circuit 5.

The recording circuit 5 records the compressed/coded AV signal (hereinafter described as the coded AV signal) inputted thereto from the encoder 3 and the representative picture data inputted thereto from the representative picture production circuit 4 onto a recording medium 6. The recording medium 6 may be, for example, a hard disk or a DVD-RAM (Digital Versatile Disc-Random Access Memory). A reproduction circuit 7 reads out the coded AV signal recorded on the recording medium 6 and outputs it to a decoder 8. The reproduction circuit 7 reads out also representative picture data recorded on the recording medium 6 and outputs the data to a representative picture display control circuit 9.

Figure 2:
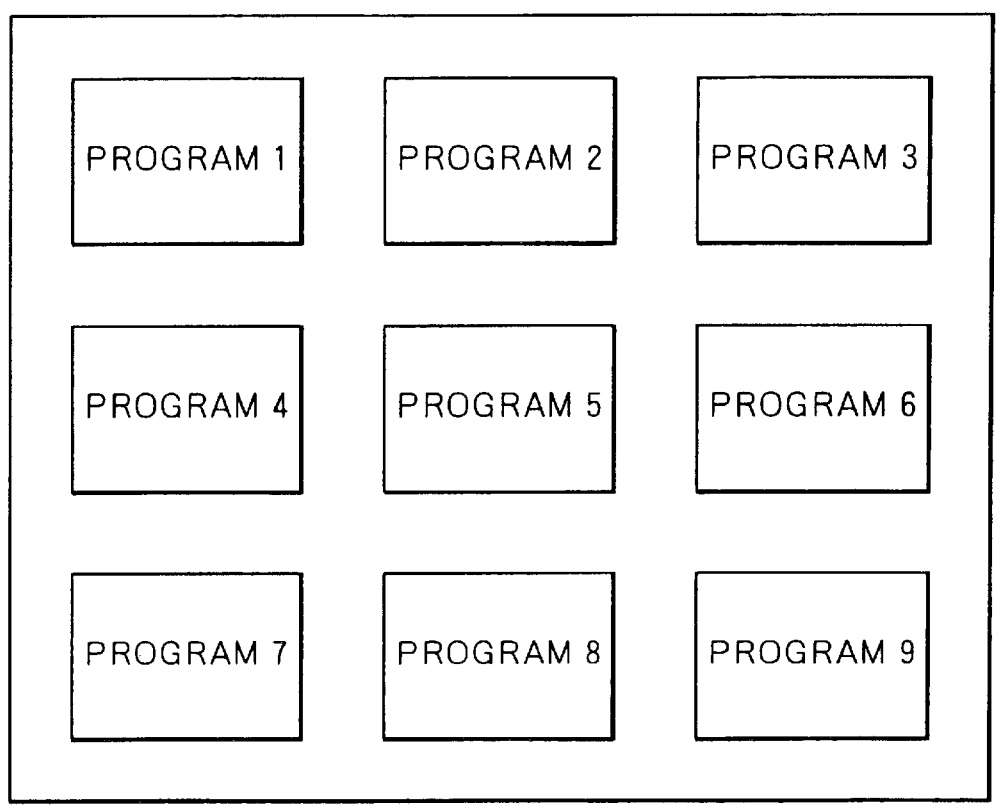
FIG. 2 is a diagrammatic view showing an example of a screen display of a representative picture table produced by the video recorder of FIG. 1.

The decoder 8 performs EFM demodulation, error correction and other necessary processing for the coded AV signal inputted thereto from the reproduction circuit 7 and then decodes a resulting signal. Then, the decoder 8 outputs a digital AV signal obtained by the decoding to a digital to analog conversion circuit (D/A) 10. The representative picture display control circuit 9 applies a plurality of representative pictures inputted thereto from the reproduction circuit 7 to one picture to produce such a representative picture table as shown in FIG. 2. Then, the representative picture display control circuit 9 outputs picture data of the representative picture table to the digital to analog conversion circuit 10.

The digital to analog conversion circuit 10 converts the digital AV signal inputted thereto from the decoder 8 or the picture data of the representative picture table inputted thereto from the representative picture display control circuit 9 into an analog signal and outputs the analog signal to an output signal processing circuit 11. The output signal processing circuit 11 performs chroma encoding and other necessary processing for the analog AV signal or the picture data of the representative picture table inputted thereto from the digital to analog conversion circuit 10 and outputs resulting data to a display unit (not shown) in the following stage.

Subsequently, operation of the video recorder of FIG. 1 is described. Upon recording, an AV signal of a television program inputted from the tuner to the video recorder is subject to AGC processing and other necessary processing in the input signal processing circuit 1. A resulting AV signal of the input signal processing circuit 1 is converted into a digital AV signal by the analog to digital conversion circuit 2, and the digital AV signal is outputted to the encoder 3 and the representative picture production circuit 4. In the encoder 3, compression coding in accordance with the predetermined method, addition of error correction codes, EFM modulation and other necessary processing are preformed for the digital AV signal. A resulting signal from the encoder 3 is recorded onto the recording medium 6 by the recording circuit 5.

Meanwhile, in the representative picture production circuit 4, representative pictures which characterize contents of the program are produced using a moving picture signal of the digital AV signal. Then, picture data of the representative pictures are outputted to the recording circuit 5 and recorded onto the recording medium 6 (details are hereinafter described with reference to FIGS. 3 to 7).

Upon reproduction, the representative pictures recorded on the recording medium 6 are read by the reproduction circuit 7 and supplied to the representative picture display control circuit 9. The representative picture display control circuit 9 produces such a representative picture table as shown in FIG. 2 wherein a plurality of representative pictures supplied from the reproduction circuit 7 are applied to one picture. Then, the representative picture display control circuit 9 outputs picture data of the representative picture table to the digital to analog conversion circuit 10. The picture data of the representative picture table is converted into an analog signal by the digital to analog conversion circuit 10. Then, the output signal processing circuit 11 performs chroma encoding and other necessary processing for the analog signal supplied thereto from the digital to analog conversion circuit 10 and supplies a resulting signal to the display unit in the following state such that it is displayed on the display unit.

If a user referring to the display of the representative picture table determines a program to be reproduced and inputs an instruction to reproduce the program to the video recorder, then the reproduction circuit 7 reads out a coded AV signal corresponding to the program recorded on the recording medium 6. The decoder 8 performs EFM demodulation, error correction and other necessary processing for the coded AV signal from the reproduction circuit 7 and then decodes a resulting signal. The decoded signal is converted into an analog signal by the digital to analog conversion circuit 10. Then, chroma encoding and other necessary processing are performed for the analog signal from the digital to analog conversion circuit 10 by the output signal processing circuit 11, and a resulting signal is supplied to and displayed on the display unit in the following stage.

Now, the representative picture recording processing of the video recorder is described with reference to a flow chart of FIG. 3. The representative picture recording processing is executed parallelly to recording processing after recording of an AV signal inputted to the video recorder is started.

In step S1, the representative picture production circuit 4 discriminates whether or not recording of an AV signal is completed, and if it is discriminated that the recording is not completed, then the processing advances to step S2. In step S2, the representative picture production circuit 4 performs extraction of a frame picture (still picture) at a predetermined sampling rate (for example, one frame picture/second) from a moving picture signal of the AV signal inputted thereto from the analog to digital conversion circuit 2. In step S3, the representative picture production circuit 4 performs title character detection processing for the frame picture extracted in step S2. It is to be noted that the title character detection processing is executed based on the assumption that a picture with which characters of a program title, a telop or the like appear on a screen can be made a representative picture which characterizes contents of the program.

Figure 4:
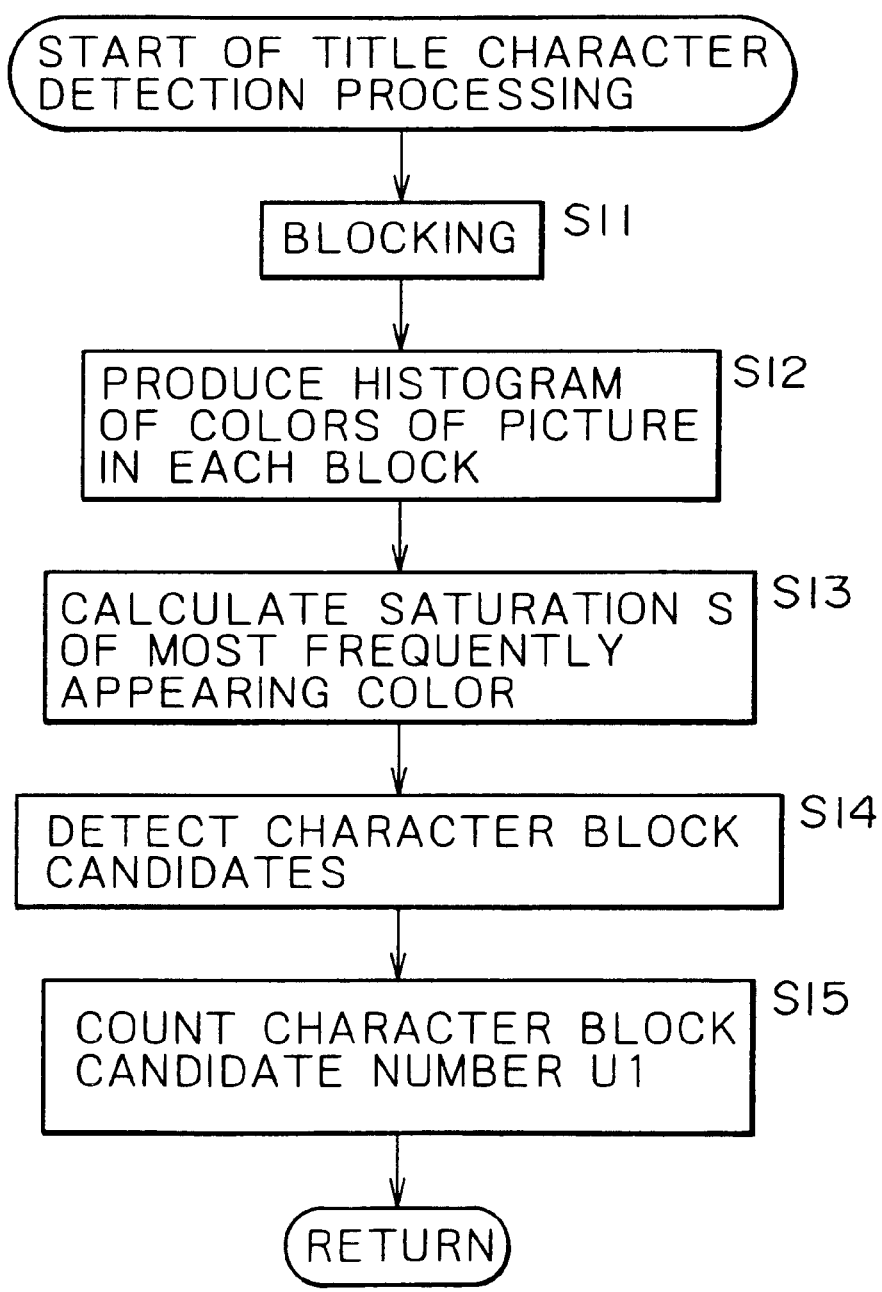
FIG. 4 is a flow chart illustrating title character detection processing of the representative picture recording processing of FIG. 3.

Details of the title character detection processing are described with reference to a flow chart of FIG. 4. In step S11, the representative picture production circuit 4 divides the frame picture (x pixels×y pixels) detected in step S2 into blocks of a pixels×b pixels. Consequently, the frame picture is divided into xy/ab (=(x/a)×(y/b)) blocks.

In step S12, the representative picture production circuit 4 produces, for each of the blocks, a histogram of pixel values (U values and V values each having C gradations) of ab pixels which form the block. The U value is, for example, Cb−128 prescribed in the ITU-R BT.601, and the V value is Cr−128 prescribed in the standard just mentioned. Further, the C gradations signifies that each of the values U and V can be represented in or can assume C different values. In step S13, the representative picture production circuit 4 substitutes the U value and the V value which appear most frequency into the following expression (1) to calculate a saturation for each block:

$$\text{Saturation } S = (U^2 + V^2)^{1/2} \qquad (1)$$

In step S14, the representative picture production circuit 4 compares the saturation S of each block calculated in step S13 with a predetermined threshold value T1 and determines those blocks which have saturation values S higher than the predetermined threshold value T1 as primary title character block candidates. Then, the representative picture production circuit 4 determines those of the primary title character block candidates which are adjacent those blocks which also are primary title character block candidates as secondary title character block candidates. Further, the representative picture production circuit 4 detects those of the blocks of the secondary title character block candidates which are included in a predetermined area (for example, a central area or therearound) of the frame picture as tertiary title character block candidates.

In step S15, the representative picture production circuit 4 counts the number of the blocks determined as the tertiary title character block candidates in step S14 as a value U1 of a title character detection processing result for the frame picture. Thereafter, the processing returns to step S4 of FIG. 3.

Referring back to FIG. 3, in step S4, the representative picture production circuit 4 performs face detection processing for the frame picture extracted in step S2. It is to be noted that the face detection processing is executed based on the assumption that a picture with which the face of a person is displayed on a screen can be made a representative picture which characterize contents of the program.

Figure 5:
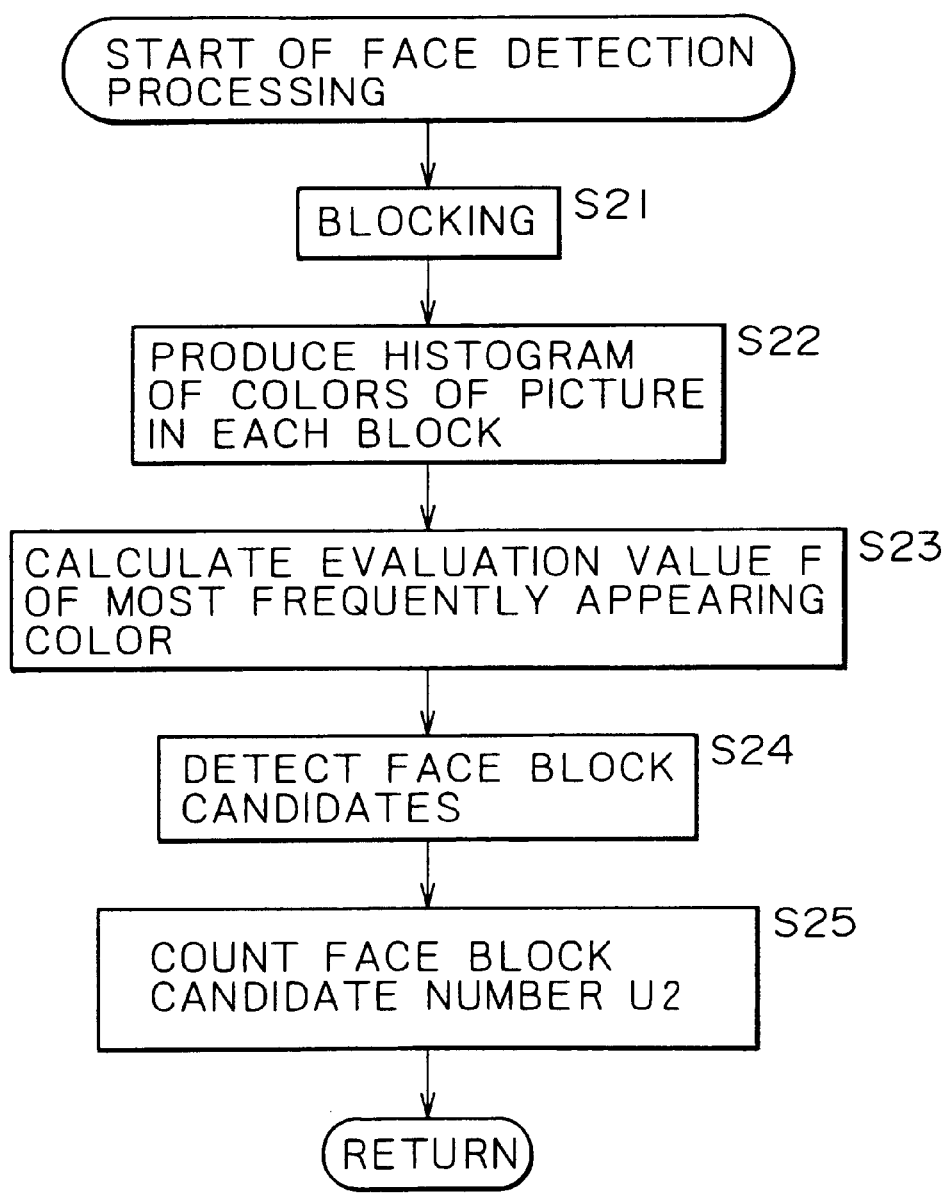
FIG. 5 is a flow chart illustrating face detection processing of the representative picture recording processing of FIG. 3.

Details of the face detection processing are described with reference to a flow chart of FIG. 5. In step S21, the representative picture production circuit 4 divides the frame picture into xy/ab blocks similarly as in step S11 for the title character detection processing.

In step S22, the representative picture production circuit 4 produces, for each of the blocks, a histogram of pixel values of ab pixels which form the block in a similar manner as in step S12 for the title character detection processing. In step S23, the representative picture production circuit 4 substitutes a U value and a V value which appears most frequently into the following expression (2) to calculate an evaluation value F for each block:

Evaluation value $F = \arctan(V/U) + \text{tm}$ (2)

In step S24, the representative picture production circuit 4 compares the evaluation value F of each block calculated in step S23 with predetermined threshold values T2 and T3 to determine those of the blocks which have evaluation values F which fall within a range between the predetermined threshold values T2 and T3 as primary face block candidates. It is to be noted that the predetermined threshold values T2 and T3 are values for detection of a color of the face and can be varied suitably. Then, the representative picture production circuit 4 determines those of the primary face block candidates which are adjacent those blocks which also are primary face block candidates as secondary face block candidates. Further, the representative picture production circuit 4 detects those of the secondary face block candidates which are included in a predetermined area (for example, a central area or therearound) of the frame picture as tertiary block candidates.

In step S25, the representative picture production circuit 4 counts the number of the blocks determined as tertiary face block candidates in step S24 as a value U2 of a face detection processing result for the frame picture. Then, the processing returns to step S5 of FIG. 3.

Referring back to FIG. 3, in step S5, the representative picture production circuit 4 extracts an audio signal corresponding to the frame picture and calculates a rate of the audio level of the audio signal with respect to the predetermined value as a value U3 of an audio detection processing result for the frame picture detected in step S2. It is to be noted that the audio detection processing is executed based on the assumption that a picture associated with a high audio level can be made a representative picture which characterizes contents of the program.

In step S6, the representative picture production circuit 4 substitutes the values U1 to U3 determined in steps S3 to S5 into the following expression (3) to calculate an evaluation value Ud indicative of whether or not the frame picture extracted in step S2 is suitable as a representative picture:

Evaluation value $Ud = \Sigma(Ui * Wi)(i=1, 2, 3)$ (3)

where Wi and Ui are coefficients representative of degrees of the importance.

In step S7, the representative picture production circuit 4 determines a frame picture whose evaluation value Ud determined in step S6 exhibits a maximum value within a predetermined time interval T as a representative picture which characterizes contents of the program. It is to be noted that details of the representative picture determination processing are hereinafter described with reference to a flow chart of FIG. 6.

In step S8, the representative picture production circuit 4 reduces the size of the frame picture determined as a representative picture in step S7 and outputs a resulting reduced still picture to the recording circuit 5. In step S9, the recording circuit 5 outputs the reduced still picture inputted thereto from the representative picture production circuit 4 to the recording medium 6. Thereafter, the processing returns to step S1 so that similar processing is repeated until it is determined in step S1 that the recording is completed.

Figure 6:
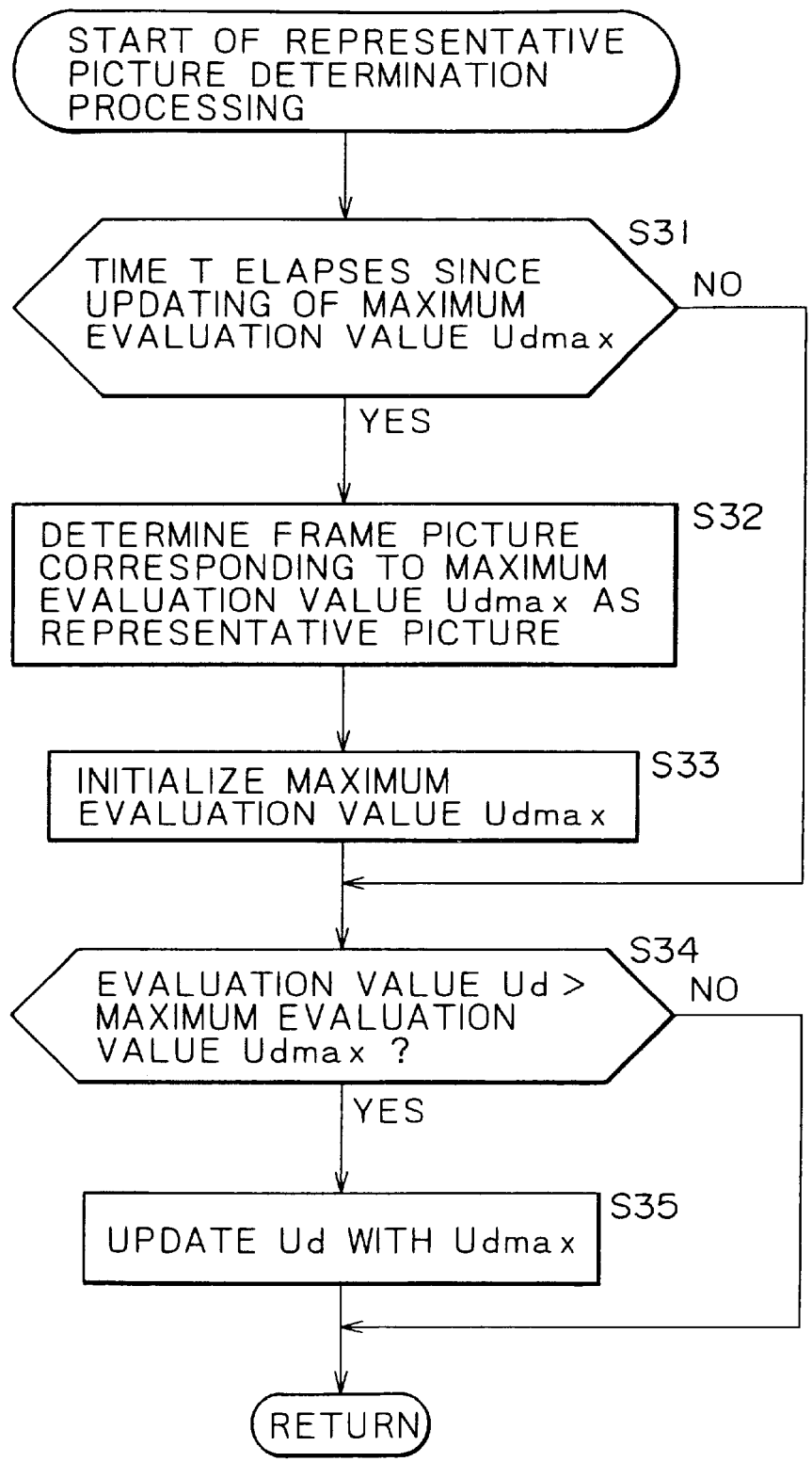
FIG. 6 is a flow chart illustrating representative image decision processing of the representative picture recording processing of FIG. 3.

The representative picture determination processing is described with reference to a flow chart of FIG. 6. In step S31, the representative picture production circuit 4 discriminates whether or not the time interval T elapses since preceding updating of maximum evaluation value Udmax. If it is determined that the time interval T does not elapse, then the processing advances to step S34. In step S34, the representative picture production circuit 4 discriminates whether or not the evaluation value Ud calculated in step S6 is greater than the maximum evaluation value Udmax. If it is discriminated that the evaluation value Ud is greater than the maximum evaluation value Udmax, then the processing advances to step S35, in which the maximum evaluation value Udmax is updated with the evaluation value Ud, whereafter the processing returns to step S8 of FIG. 3.

It is to be noted that, if it is discriminated in step S31 that the time interval T elapses since the preceding updating of the maximum evaluation value Udmax, then the processing advances to step S32. In step S32, the representative picture production circuit 4 determines the frame picture corresponding to the maximum evaluation value Udmax as a representative picture. In step S33, the representative picture production circuit 4 initializes the maximum evaluation value Udmax to 0.

Figure 3:
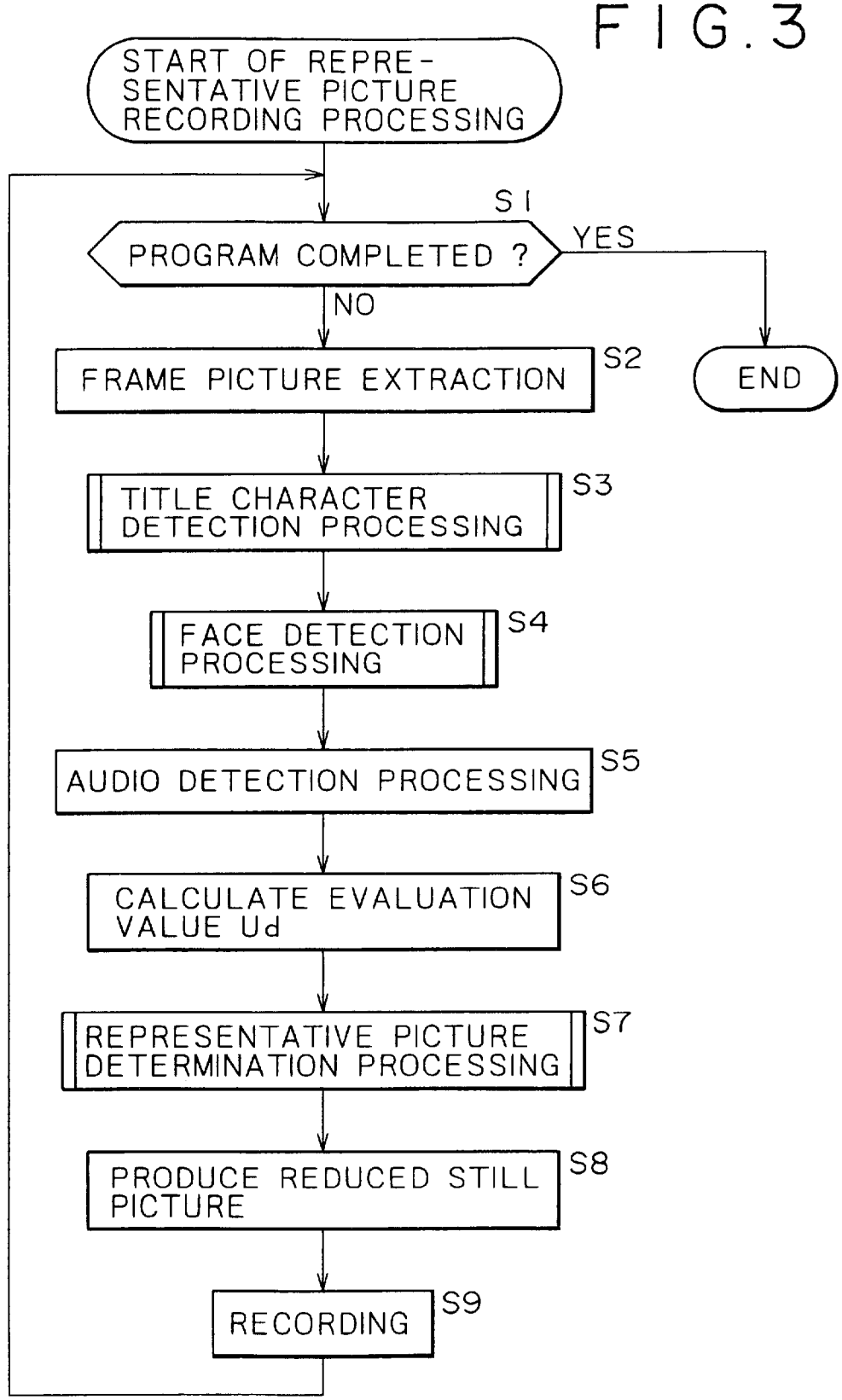
FIG. 3 is a flow chart illustrating representative picture recording processing of the video recorder of FIG. 1.

On the other hand, if it is discriminated in step S34 that the evaluation value Ud is not greater than the maximum evaluation value Udmax, then the processing skips the step S35 and returns to step S8 of FIG. 3.

Figure 7:
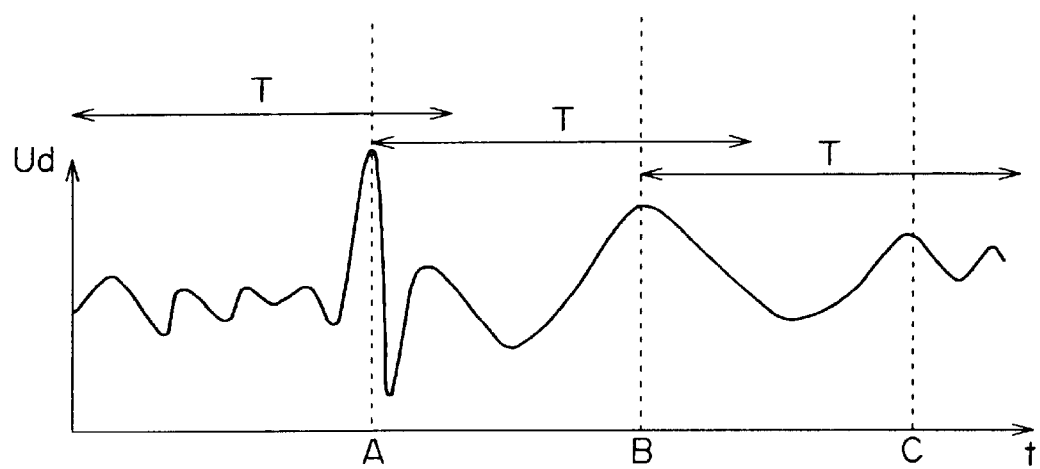
FIG. 7 is a diagrammatic view illustrating representative image decision processing of the representative picture recording processing of FIG. 3.

By executing the representative picture determination processing described above, a frame picture which corresponds to a maximum value of the evaluation value Ud (for example, points A, B and C of FIG. 7) for each time interval T as seen from FIG. 7 is determined as the representative picture. It is to be noted that, since the time interval T can be set suitably, it is possible to determine an arbitrary number of frame pictures as representative pictures in a unit time.

As described above, since the representative picture storage processing is executed simultaneously with recording of a program to produce a recording medium 6 on which representative pictures of a plurality of programs are recorded together with the programs, a user of the video recorder can grasp the programs recorded on the recording medium 6 readily by causing the video recorder to display the table of the representative pictures. Further, since it is possible to record a plurality of representative pictures for one program, a scene of a program to be observed can be searched out readily.

It is to be noted that, in the representative picture recording processing, only one of the title character detection processing, face detection processing and audio detection processing in steps S3 to S5 may be executed to determine a representative picture, or suitable two of the three processes may be selectively combined to determine a representative picture.

A representative picture may alternatively be detected by a combination of analysis results of information of a program genre, a title, a broadcasting hour, a channel, a commercial message and so forth included in the television signal.

It is to be noted that the AV signal to be inputted to the video recorder described above is not limited to that of a television broadcast, but, for example, an AV signal obtained by image pickup using a video camera may be inputted to the video recorder so that a representative picture of the AV signal may be recorded.

Further, while, in the embodiment described above, an AV signal and a representative picture of a program are recorded onto the same recording medium 6, they may otherwise be recorded onto different recording media from each other.

By the way, the series of processes described above may be executed by hardware or by software. Where the series of processes is executed by software, a program which constructs the software is installed into a computer incorporated in a video recorder as hardware for exclusive use or, for example, a personal computer for universal use which can execute various functions by installing various programs.

Now, a medium on which the program for execution of the series of processes described above is recorded and which is used to install the program into a computer so that the program may be executed by the computer is described with reference to FIGS. 8A to 8C taking a case wherein the computer is a personal computer for universal use as an example.

Figure 8A:
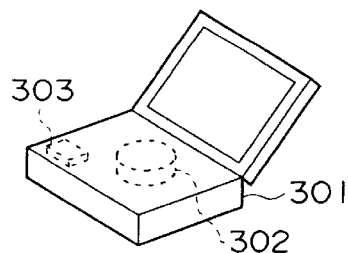
FIGS. 8A to 8C are schematic views showing various media to be used to install a program into a personal computer to cause the personal computer to execute the program.

In particular, the program can be provided to a user in such a form that it is installed in advance in a hard disk 302 or a semiconductor memory 303 as a recording medium built in a personal computer 301 as shown in FIG. 8A.

As an alternative, the program may be provided as package software by temporarily or permanently storing (recording) it on such a recording medium as a floppy disk 311, a CD-ROM (Compact Disc Read Only Memory) 312, an MO (Magneto-optical) disk 313, a DVD (Digital Versatile Disc) 314, a magnetic disk 315 or a semiconductor memory 316.

Figure 8B:
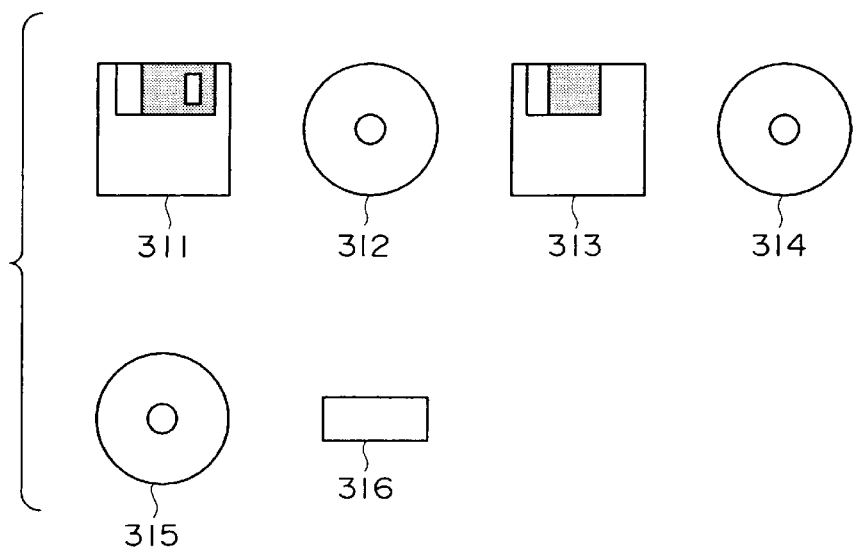
Figure 8C:
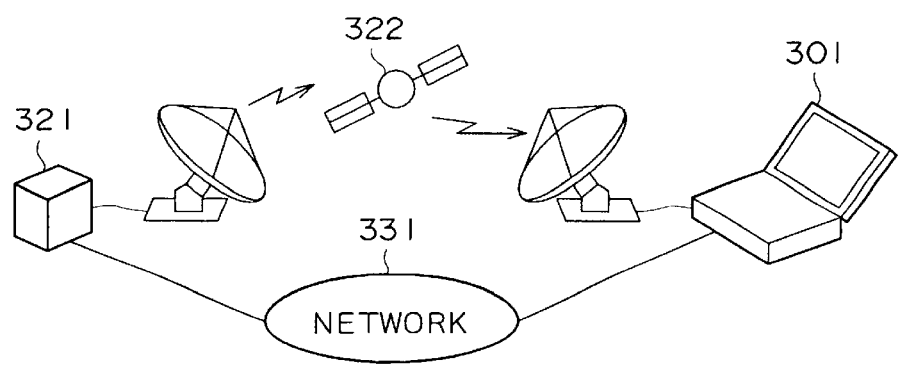

As another alternative, as shown in FIG. 8B, the program may be transferred by radio to the personal computer 301 from a down load site 321 through an artificial satellite 322, or may be transferred by radio or by wire to the personal computer 301 over a network 331 such as a local area network or the Internet and then installed into the built-in hard disk 302 by the computer 301.

It is to be noted that the term "medium" in the present specification is used to signify in a broad sense including all such media as mentioned hereinabove.

Figure 9:
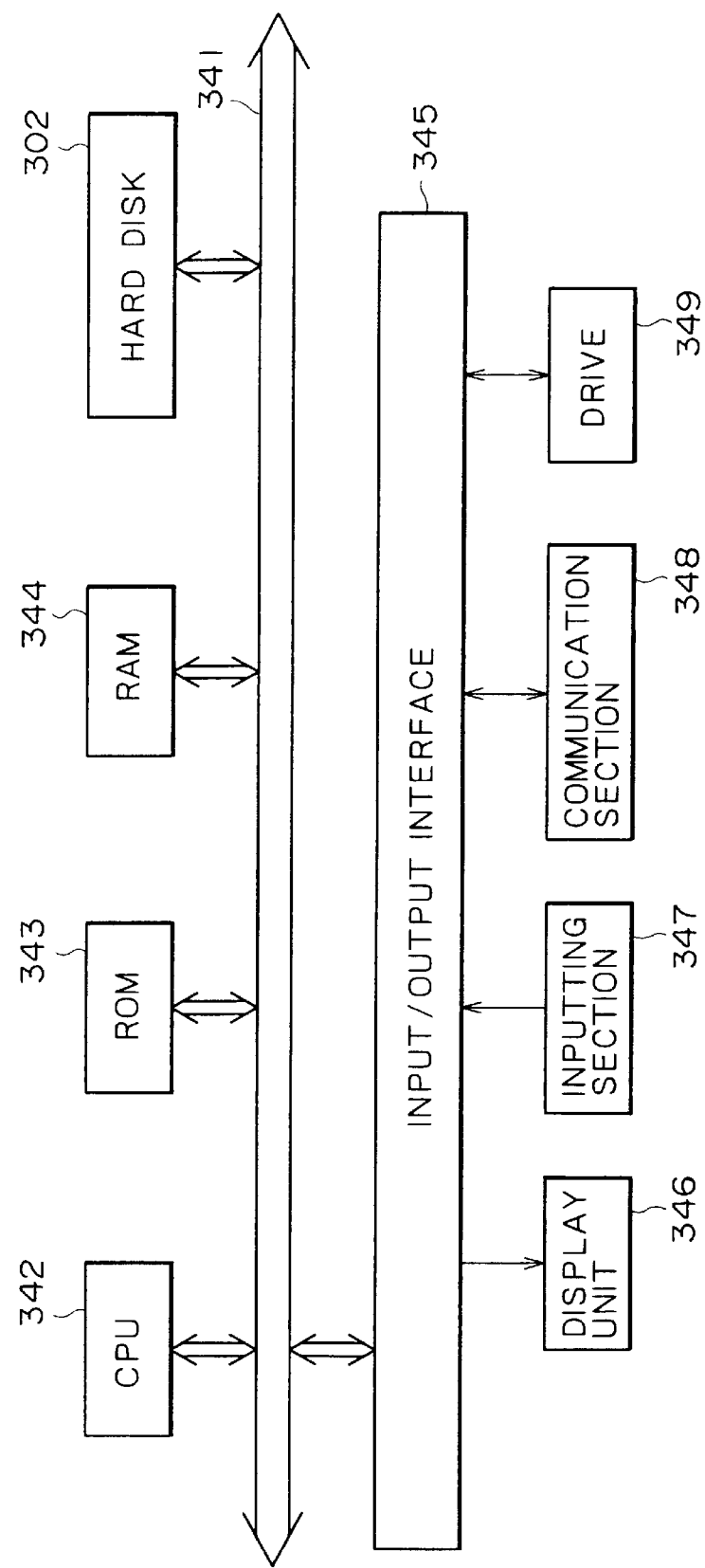
FIG. 9 is a diagrammatic view showing a general construction of a personal computer.

Referring to FIG. 9, for example, the personal computer 301 has a CPU (Central Processing Unit) 342 built therein. An input/output interface 345 is connected to the CPU 342 over a bus 341. If a user operates an inputting section 347 which is formed from a keyboard, a mouse or the like to input an instruction to the CPU 342 through the input/output interface 345, then, in response to the instruction, the CPU 342 executes a program stored in a ROM (Read Only Memory) 343, which corresponds to the semiconductor memory 303 of FIG. 8A; a program transferred from the satellite 322 or the network 331, received by a communication section 348 and then installed on the hard disk 302; or a program read out from the floppy disk 311, CD-ROM 312, MO disk 313, DVD 314 or magnetic disk 315 loaded on a drive 349 and installed on the hard disk 302, after loading each program into a RAM (Random Access Memory) 344. Further, the CPU 342 outputs, when necessary, a result of the processing, for example, to a display unit 346, which is formed from an LCD (Liquid Crystal Display) unit or the like, through the input/output interface 345.

It is to be noted that, in the present application, the steps which describe the program provided in the form of a medium may be but need not necessarily be processed in a time series in the order as described, and include processes which are executed parallelly or individually.

Further, the term "system" in the present specification is used to represent an entire apparatus which includes a plurality of apparatus.

While a preferred embodiment of the present invention has been described using specific terms, such description is for illustrative purposes only, and it is to be understood that changes and variations may be made without departing from the spirit or scope of the following claims.

What is claimed is:

1. A moving picture recording and reproduction apparatus, comprising:

recording means for recording a moving picture signal inputted thereto onto a recording medium;

extraction means for extracting still pictures at a predetermined sampling rate from the moving picture signal;

calculation means for calculating evaluation values of the still pictures extracted by said extraction means using pixel values of the still picture;

detection means for detecting a maximum one of the evaluation values calculated by said calculation means;

representative picture production means for reducing the size of the still picture corresponding to the maximum one of the evaluation values detected by said detection means to produce a representative picture;

recording means for recording the representative picture produced by said representative picture production means onto the recording medium;

reading means for reading out the representative picture recorded by said recording means from the recording medium; and table production means for applying the representative picture or pictures read out by said reading means to produce a representative picture table.

2. A moving picture recording and reproduction apparatus according to claim 1, wherein said detection means detects a maximum evaluation value from among an arbitrary number of evaluation values per unit time.

3. A moving picture recording and reproduction apparatus according to claim 1, wherein said calculation means uses the pixel values of the still picture extracted by said extraction means to determine an accuracy with which a character is present on the still picture and uses the accuracy to calculate the evaluation value.

4. A moving picture recording and reproduction apparatus according to claim 1, wherein said calculation means uses the pixel values of the still picture extracted by said extraction means to determine an accuracy with which the face of a person is present on the still picture and uses the accuracy to calculate the evaluation value.

5. A moving picture recording and reproduction apparatus according to claim 1, wherein said calculation means detects a level of an audio signal corresponding to the still picture extracted by said extraction means and uses the level of the audio signal to calculate the evaluation value.

6. A moving picture recording and reproduction method, comprising:

a recording step of recording an inputted moving picture signal onto a recording medium;

an extraction step of extracting still pictures at a predetermined sampling rate from the moving picture signal;

a calculation step of calculating evaluation values of the still pictures extracted by the extraction step using pixel values of the still picture;

a detection step of detecting a maximum one of the evaluation values calculated by the calculation step;

a representative picture production step of reducing the size of the still picture corresponding to the maximum one of the evaluation values detected by the detection step to produce a representative picture;

a recording step of recording the representative picture produced by the representative picture production step onto the recording medium;

a reading step of reading out the representative picture recorded in said recording step from the recording medium; and a table production step of applying the representative picture or pictures read out by the reading step to produce a representative picture table.

7. A medium for causing a computer to execute a program which comprises:

a recording step of recording an inputted moving picture signal onto a recording medium;

an extraction step of extracting still pictures at a predetermined sampling rate from the moving picture signal;

a calculation step of calculating evaluation values of the still pictures extracted by the extraction step using pixel values of the still picture;

a detection step of detecting a maximum one of the evaluation values calculated by the calculation step;

a representative picture production step of reducing the size of the still picture corresponding to the maximum one of the evaluation values detected by the detection step to produce a representative picture;

a recording step of recording the representative picture produced by the representative picture production step onto the recording medium;

a reading step of reading out the representative picture in said recording step from the recording medium; and a table production step of applying the representative picture or pictures read out by the reading step to produce a representative picture table.

* * * * *